(12) United States Patent
Zhang et al.

(10) Patent No.: US 7,756,685 B2
(45) Date of Patent: Jul. 13, 2010

(54) METHOD FOR AUTOMATIC COMMUNITY MODEL GENERATION BASED ON UNI-PARITY DATA

(75) Inventors: Zhongfei Zhang, Vestal, NY (US); John J. Salerno, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1885 days.

(21) Appl. No.: 10/800,489

(22) Filed: Mar. 15, 2004

(65) Prior Publication Data

US 2005/0203838 A1 Sep. 15, 2005

(51) Int. Cl.
*G06F 7/60* (2006.01)
*G06F 17/10* (2006.01)

(52) U.S. Cl. .......................................................... 703/2

(58) Field of Classification Search .................... 703/2; 707/102; 706/48, 933; 705/35, 38, 39
See application file for complete search history.

(56) References Cited

OTHER PUBLICATIONS

Zhang, Z., Salerno, J. J., and Yu, P. S. 2003. Applying data mining in investigating money laundering crimes. In Proceedings of the Ninth ACM SIGKDD international Conference on Knowledge Discovery and Data Mining (Washington, D.C., Aug. 24-27, 2003). KDD '03. ACM, New York, NY, 747-752.*

* cited by examiner

*Primary Examiner*—Paul L Rodriguez
*Assistant Examiner*—Luke Osborne
(74) *Attorney, Agent, or Firm*—Joseph A. Mancini

(57) ABSTRACT

Method for automatic community model generation based on uni-parity data. Correlation analysis is employed to identify links within the community. Method may be particularized for solving specific problems such as determining the activities between individuals within a money laundering ring.

10 Claims, 6 Drawing Sheets

US 7,756,685 B2

METHOD FOR AUTOMATIC COMMUNITY MODEL GENERATION BASED ON UNI-PARITY DATA

STATEMENT OF GOVERNMENT INTEREST

The invention described herein may be manufactured and used by or for the Government of the United States for governmental purposes without the payment of any royalty thereon.

BACKGROUND OF THE INVENTION

It can be very useful to know about activities between individuals. For example, what individuals are associated with other individuals? Which individuals communicate with other individuals? When two or more individuals get together is there an intended purpose? Who are the leaders or important individuals of a group? What is the organizational structure of the group? It can prove useful further yet to have the capability to actually model the above types of interactions and associations. To an extent, this type of social research has been addressed by employing the disciplines of data mining and community generation.

Examples of such problems include mining movie data to find out how actors/actresses, directors, and producers are linked to different movies and how the movies are linked to different awards; mining on Web community or topic related documents to find out where the hubs and authorities or the related documents are and how they are linked together; mining the commercial merchandise sales data of a franchise store nation-wide to determine the associations (or correlations) among a group of merchandise items; mining customer search topic data collected over a period of time in a library to identify a group of related common interests and their relationships; and mining the traffic data collected from a wide network of geographical locations nation-wide or within a specific area (e.g., NY City) to find out the traffic accident pattern correlations among a group of locations. The government or civilian sector also has a number of requirements for such a capability. Such examples include the identification of terrorist cells, crime rings such as money laundering, drug interdiction and the identification of tactical units in the battlefield.

In some of the problems the data is given with existing links such as the movie data with actor-movie links and the Web data with Web links while in others the data is given completely in isolation and no link information is available such as sales data, customer search topic data collected from a library, or traffic records collected in different geographical locations. The goal then is to generate communities based on yet-to-be-determined links between the data items. Current research in community generation focuses on the former and is addressed under the area of relational data mining and learning in the literature. But what happens when you don't have explicit link/relationship information? To our knowledge, nobody has systematically addressed this class of problems and in fact it has not even been identified as another paradigm within the community generation area let alone the data mining community. To this avail, we have entitled this set of problems as the Uni-party Data Community Generation (UDCG) problem. To facilitate the comparison, we call the former class of problems (where we know or are given the relationships) as Bi-party Data Community Generation (BDCG) problems.

OBJECTS AND SUMMARY OF THE INVENTION

It is therefore an object of the present invention to provide a methodology for solving a uni-party data community generation paradigm.

A further object of the present invention is to provide a method which employs automatic community model generation for solving a uni-party data community generation paradigm.

Yet another object of the present invention is to employ Link Discovery based on Correlation Analysis (LDCA) for generating an automatic community model.

A particular object of the present invention is to provide a method for solving a Money Laundering Crime (MLC) case.

Briefly stated, the present invention provides a method for automatic community model generation based on uni-parity data. Correlation analysis is employed to identify links within the community. Method may be particularized for solving specific problems such as determining the activities with a money laundering ring.

A generalized embodiment of the present invention, method for automatic community model generation based on uni-parity data, comprises the steps of hypothesizing a subset S of set U, wherein for any pair of items in subset S there exists a mathematical function C applicable to the pair of items so as to generate a correlation value and correlation relationship between any pair of items in subset S; generating correlation values by applying the function C to each of the pairs of items in subset S; graphing $G(S,E)$, wherein E is the edge set of graph G with computed correlation values as weights; and mapping graph G to one of its subgraphs $M \subseteq G$ so as to generate a community.

A further embodiment of the present invention, method for solving a community generation problem, comprises the steps of converting documents to digital form and tagging the digitized documents; parsing the digitized and tagged documents to extract the transaction history vector for each individual; creating timelines of the transaction vectors so as to form a timeline map; determining the relevancy of the vectors; projecting the vectors along a time dimension so as to form as histogram; translating the vectors into groups of activities by histogram clustering; determining the local correlation between any pair of clusters in the timeline of two individuals; computing the global correlations between pairs of individuals; converting data to a graph as a function of all individuals extracted from the documents and the correlation values between individuals; generating models based on a search of all subgraphs with correlation values above a threshold; and outputting a group model.

A particular embodiment of the present invention for solving a money laundering problem comprises applying the "one way nearest neighbor" principle, wherein the "one way nearest neighbor" principle further comprises that for every person's name encountered, the first immediate time instance is the first time instance for a series of financial activities; the second immediate time instance is the second time instance for another series of financial activities, etc.; for every time instance encountered, all the subsequent financial activities are considered as the series of financial activities between this time instance and the next time instance; financial activities are identified in terms of money amount; money amount is neutral in terms of deposit or withdrawal; each person's time sequence of financial activities is updated if new financial activities of this person are encountered in other places of the same document or in other documents; and the financial activities of each time instance of a person is updated if new financial activities of this time instance of the same person are encountered in other places of the same document or in other documents.

To the accomplishment of the foregoing and related ends, the present invention, then, comprises the features hereinafter fully described and particularly pointed out in the claims. The following description and the annexed figures set forth in detail certain illustrative embodiments of the invention. These embodiments are indicative, however, of but a few of the various ways in which the principles of the invention may be employed. Other objects, advantages and novel features of the present invention will become apparent from the following detailed description of the invention when considered in conjunction with the figures.

DETAILED DESCRIPTION OF THE GENERALIZED EMBODIMENT

In this section, we propose a general methodology, called Link Discovery based on Correlation Analysis (LDCA), as a solution to the general uni-party data community generation problem. LDCA uses a correlation measure to determine the "similarity" of patterns between two data items to infer the strength of their linkage. The correlation measure may be defined in fuzzy logic to accommodate the typical impreciseness of the "similarity" of patterns.

Figure 1:
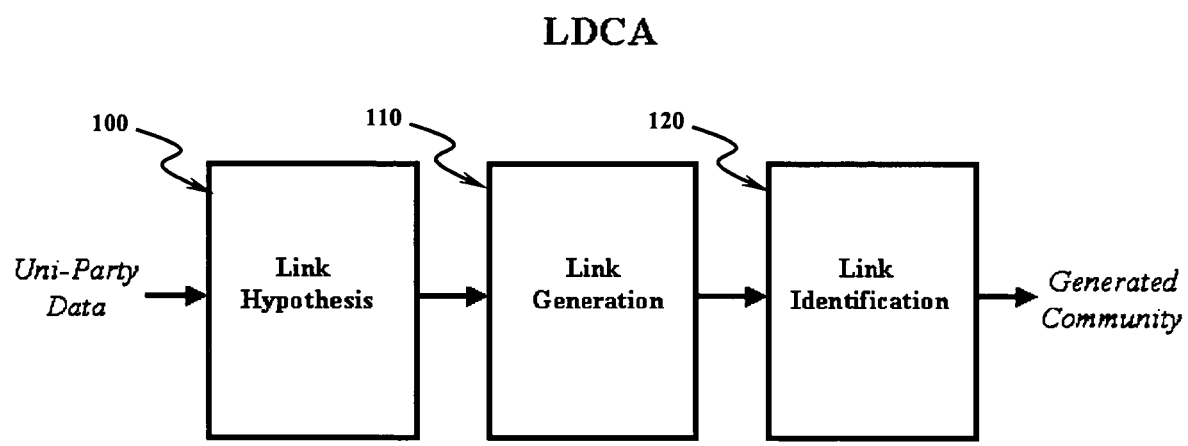
FIG. 1 depicts the primary processes comprising a preferred embodiment of the present invention.

Referring to FIG. 1, the components of LDCA as well as the data flow of these components are depicted. In principle, LDCA consists of three basic steps. For each problem in the uni-party data community generation paradigm, assume that the data item set is U. A Link Hypothesis step 100 hypothesizes a subset S of U, such that for any pair of the items in S there exists a mathematical function (or a procedural algorithm) C that applies to this pair of items to generate a correlation value in the range of [0, 1], i.e., this step defines the correlation relationship between any pair of items in S:

$$\forall p,q \in S \subseteq U, C: S \times S \rightarrow [0,1]$$

A Link Generation step 110 then applies the function C to every pair of items in S to generate the correlation values. This results in a complete graph G(S,E) where E is the edge set of the graph with computed correlation values as the weights of the edges. Finally, a Link Identification step 120 defines another function P that maps the complete graph G to one of its subgraph $M \subseteq G$ as a generated community.

AN ILLUSTRATIVE EXAMPLE OF THE PREFERRED EMBODIMENT MONEY LAUNDERING CRIME

The Link Discovery based on Correlation Analysis (LDCA) methodology was applied to solving a specific community generation problem—the identification of members within a Money Laundering Crime (MLC) Group. Specific algorithms are used in the LDCA process. Such algorithms have been implemented and tested in a prototype system which the present invention refers to as CORrelation AnaLysis (CORAL).

Preparing the Data

The input data to the MLC model generation problem is based on free text documents. The data is obtained from varying sources, such as bank statements, financial transaction records, personal communication letters (including emails), loan/mortgage documents, as well as other related reports.

Figure 2:
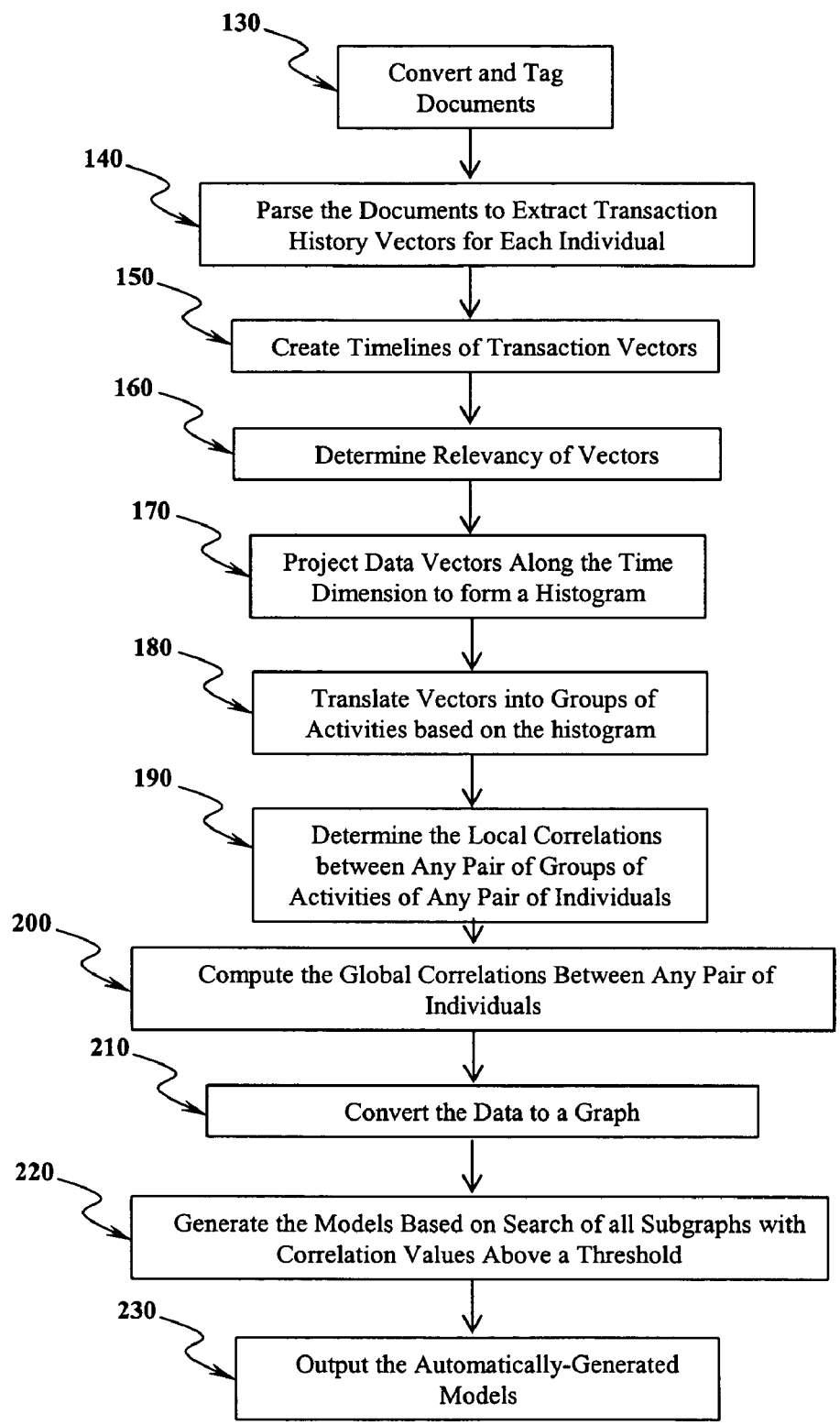
FIG. 2 depicts a block diagram process flow chart of an illustrative example of the preferred embodiment to solve a money laundering crime problem.

Referring to FIG. 2, the documents are converted 130 to a digital format using an OCR and key entities, (e.g., person names, organization names, financial transaction times and dates, location addresses, as well as transaction money amounts) are tagged 130 using an extraction tool using XML. No link information is tagged, thereby making the problem an excellent candidate for applying the LDCA methodology.

Once the data set is identified and acquired (i.e., obtained, converted and tagged), it must be developed to define an internal data structure. Due to the nature of the data and the lack of detailed meta-like data, a number of rules and assumptions are required. The rules and assumptions to be applied by the present invention are:

- The data set U is the set of all extracted individuals from the collection of the given documents.
- For each individual, there is a corresponding financial transaction history vector (may be null) along timeline.
- The correlation between two individuals is defined through a correlation function between the two corresponding financial transaction history vectors.
- If two individuals are in the same MLC group, they should exhibit similar financial transaction patterns, and thus, should have a higher correlation value.
- Any two individuals may have a correlation value (including 0), i.e., S=U.

Since the present invention has access to only the isolated and tagged entities in the document, assumption must be made to reasonably "guess" the associated relationships between the extracted time/date stamps and the money amount of a specific transaction with the extracted individual. Therefore, when the present invention parses 140 the collection of documents to extract the financial transaction history vectors for every individual, it follows the "one way nearest neighbor" principle:

- For every person's name encountered, the first immediate time instance is the first time instance for a series of financial activities; the second immediate time instance is the second time instance for another series of financial activities, etc.
- For every time instance encountered, all the subsequent financial activities are considered as the series of financial activities between this time instance and the next time instance.
- Financial activities are identified in terms of money amount; money amount is neutral in terms of deposit or withdrawal.

Each person's time sequence of financial activities is updated if new financial activities of this person are encountered in other places of the same document or in other documents. The financial activities of each time instance of a person is updated if new financial activities of this time instance of the same person are encountered in other places of the same document or in other documents.

Figure 3:
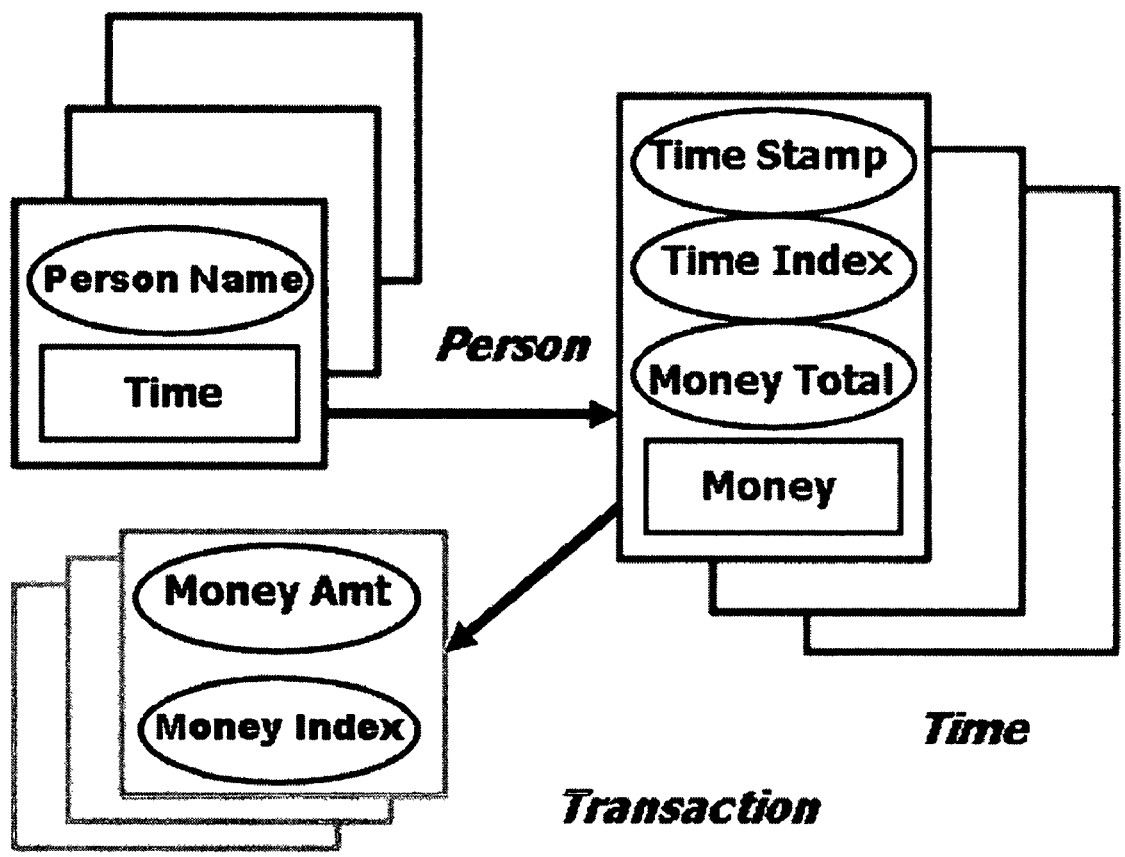
FIG. 3 depicts an event-driven, three-dimensional, nested data structure from the money laundering crime problem.

Based on the rules described above, whenever a new individual's name is encountered, a new PERSON event is created (see FIG. 3); whenever a new time instance is encountered, a new TIME event is created under a PERSON event (see FIG. 3); whenever a new financial transaction is encountered, a new TRANSACTION event is created linked to both corresponding TIME and PERSON events (see FIG. 3). All the events are represented as vectors. FIG. 3 depicts the data structure created by the present invention.

Figure 4:
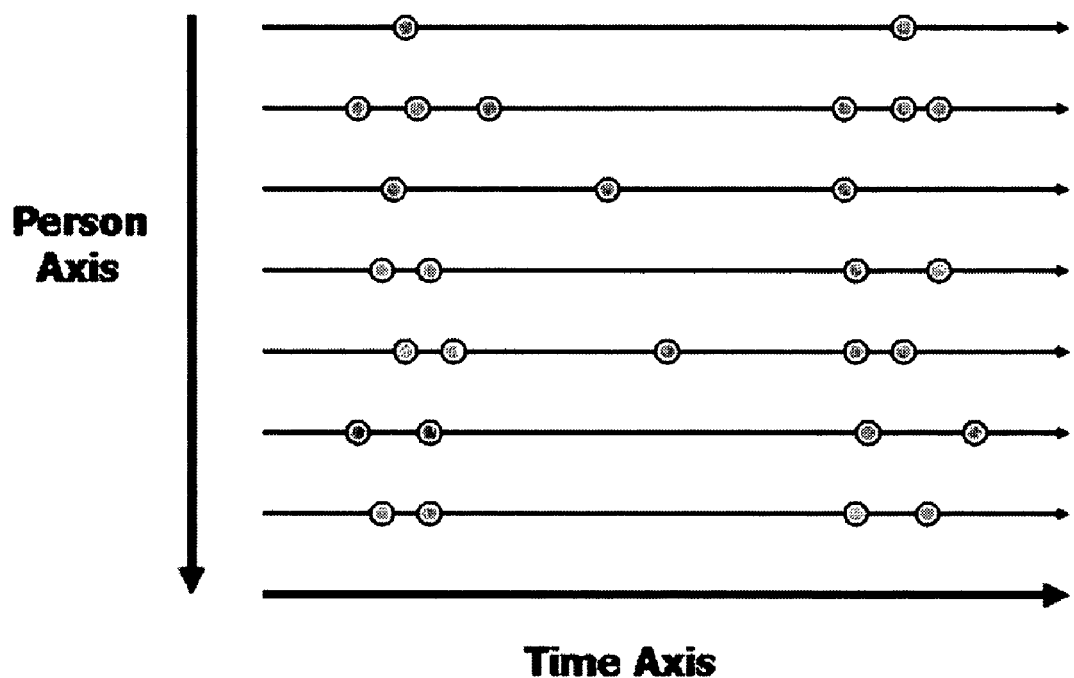
FIG. 4 depicts a timeline map from the three-dimensional, monetary vector money laundering crime problem.

Still referring to FIG. 2, timelines are created 150 as a result of parsing 140 the entire collection of documents and using the given data structure. Each timeline (see FIG. 4) represents the financial transaction history vector of each individual. The time axis of the timelines is divided into discrete time instances. Each node in the timelines is called a "monetary vector" that records the part of the financial transaction history of the corresponding person between the current time instance and the next time instance.

While the above "one way nearest neighbor" parsing principle may not be necessarily true in all the circumstances, it is believed to be the best for the following two reasons: (1) this is the best outcome in the absence of the actual association information in the data; (2) the experimental evaluations show that the generated models based on this principle are reasonably accurate.

The next part of this step is to determine relevancy 160 or, determine which monetary vectors are "useful", i.e., is an individual related to the money laundering case being investigated, and which vectors are just noise (e.g., a "normal" financial transaction of an individual such as a "normal" purchasing activity, or a false association between one's monetary activity and someone else due to the one way nearest neighbor parsing principle). Since the present invention does not know the relevancy of the data, a "guess" must be made. During the data collection process the investigators typically have the intention to collect all the documents that are related to suspects in the case, or those either suspiciously or routinely related to the case; thus, it is expected that for those individuals who might be involved in the crimes, the majorities of their monetary vectors should be well clustered into several "zones" in the timeline axis (see FIG. 4) where the actual MLCs are committed. This assumption is referred to as the "focus" assumption. Based on the focus assumption, the present invention needs to pay attention to only the "clusters" of the monetary vectors in the timeline map, and can ignore those monetary vectors that are scattered over other places of the timeline map. This allows maximum filtering of the noise when determining the correlation between two individuals.

Figure 5:
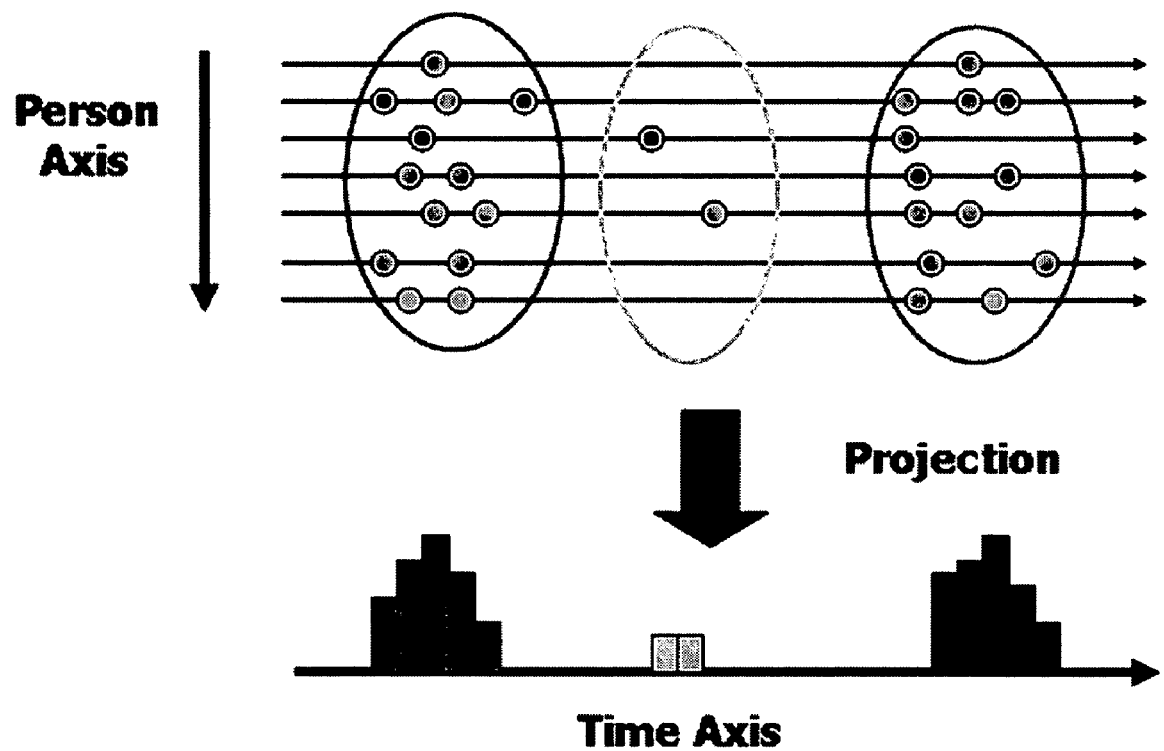
FIG. 5 depicts a clustering algorithm based on histogram segmentation from the money laundering crime problem.

The present invention next projects 170 all the monetary vectors of all the individuals into the timeline axis to form a histogram (see FIG. 5). Consequently, the clustering problem is reduced to a segmentation problem in the histogram to divide the entire timeline into different time zones, or called groups of activities 180.

A histogram is generated (see FIG. 5) from all the monetary vectors along the timeline. Since the projection and the histogram segmentation may be performed in linear time in the timeline space, this clustering algorithm significantly improves the complexity and avoids the iterative search a "normal" clustering algorithm such as the K-means algorithm would typically require. The resulted number of "hills" (i.e., segments) in the histogram becomes the K clusters or time zones as groups of activities.

Link Hypothesis

At this point the present invention has formatted the data in a manner in which it can compute correlation values 200 among pairs of people. After clustering, each individual's financial transaction history vector may be represented as a timeline histogram partitioned into K clusters. The K clusters may in turn be represented as K histogram functions of time t: $<f_i(t)>$, (where $f_i(t)$ is the financial transaction histogram of this individual in cluster i). The correlation between two individuals $<x,y>$ is defined as an combined global correlation of all the local correlations between the two individuals, whereas the local correlation is defined as the correlation between two clusters of the timeline histograms of the two individuals.

Figure 6:
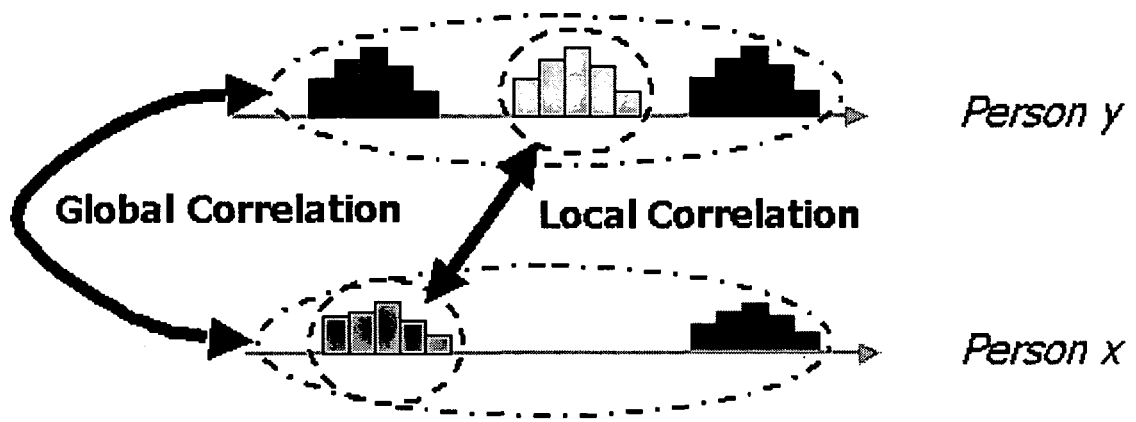
FIG. 6 depicts an illustration of the algorithm to determine the correlation between two individuals from the money laundering crime problem.

Global correlation is determined 200 from local correlations between two individuals x and y (see FIG. 6). The correlation is defined as this "two level" function due to the unique nature of the problem, i.e., individuals in the same MLC group may exhibit similar financial transaction patterns in different time "zones" (which constrains the local correlation), but the difference in the timeline of their financial activities should not be too large (which constrains the global correlation). While the local correlation is defined following a standard approach in Pattern Recognition literature to determining a fuzzified "similarity" between two functions, the global correlation is defined based on the unique nature of this problem to further constrain the overall "similarity" between the financial transaction patterns along the timeline of two individuals.

In defining a reasonable correlation function, it should be noted that the concept of similar financial transaction patterns is always fuzzy. That is to say, if two individuals belong to the same crime group and are involved in the same MLC case, it is unlikely that they would conduct transactions related to the crime simultaneously at the exact time, nor is it likely that they would conduct transactions related to the crime at times that are of a year difference. It would be likely that they conduct the transactions at two different times close to each other. Consequently, we apply fuzzy logic in both definitions of the local and global correlations to accommodate the actual "inaccuracy" of the occurrences in the extracted financial transaction activities between different individuals at different times.

Local Correlation

The present invention defines $fx_i(t)$ and $fy_j(t)$ be the financial transaction histogram functions of individual x and y in cluster i and j, respectively. Following the standard practice to define a fuzzified correlation between two functions, it then uses the Gaussian function as the fuzzy resemblance function within cluster i between time instance a and b:

$$G_i(a,b) = \frac{1}{\sqrt{2\pi}\sigma_i} e^{-\frac{(a-b)^2}{2\sigma_i^2}}$$

$$\sigma_i = \frac{2}{W_i(W_i-1)} \sum_{a=1}^{W_i} \sum_{b=a+1}^{W_i} |a-b|$$

where $\sigma_i$ is defined accordingly based on the specific context in this problem, and $W_i$ is the width of the cluster i.

The Gaussian function is used because it gives a natural decay over the time axis to represent the fuzzy resemblance between two functions. Consequently, two transactions of two individuals which occurred at closer times results in more resemblance than those which occurred at farther away times. It can be shown that after applying the fuzzy logic using the Gaussian function as the resemblance function, the resulting fuzzified histogram is the original one convolved with the fuzzy resemblance function.

$$gx_i(t) = \sum_{t'=1}^{W_i} fx_i(t')G_i(t, t')$$

Thus, determining the local correlation 190 between $fx_i(t)$ and $fy_i(t)$ is defined as determining the maximum convolution value $$g(x_i, y_j) = \max_{t=0}^{W_i} \sum_{t'=-W_j}^{W_j} gx_i(t')gy_j(t-t')$$

Global Correlation

The present invention assumes that the timeline axis is clustered into K segments. Based on the definition of the local correlation 190, for each individual x, at every cluster i, there is a set of K local correlations with individual y $\{g(x_i, y_j), j=1, \ldots, K\}$. It then assigns the fuzzy weights to each of the elements of the set based on another Gaussian function to accommodate the rationale that strong correlations should occur between financial transactions of the same crime group closer in time than those farther away in time. Thus, the following series results:

$$\{g(x_i, y_j)S(i,j), j=1, \ldots, K\}$$

where $$S(i, j) = e^{-\frac{(c_i - c_j)^2}{2\sigma_i^2}}$$

and $c_i$ and $c_j$ are the centers of cluster i and cluster j along the timeline.

The correlation between individual x in cluster i and the whole financial transaction histogram of individual y is then defined based on the winner-take-all principle:

$$C(x_i, y) = \max_{j=1}^{K}\{g(x_i, y_j)S(i,j)\}$$

Defining the vectors $$Cy(x) = <C(x_i, y), =, \ldots, K>$$

$$Cx(y) = <C(y_i, x), i=1, \ldots, K>$$

then computing global correlation 200 between x and y is defined by computing the dot product between the two vectors:

$$C(x, y) = Cy(x) \cdot Cx(y) = \sum_{i=1}^{K} C(x_i, y)C(y_i, x)$$

Link Generation

After applying the correlation function to determine the global correlation 200 to every pair of individuals in the data set U, the present invention obtains a complete graph G(V, E) 210, where V is the set of all the individuals extracted from the given collection of the documents, and E is the set of all the correlation values between individuals such that for any correlation C(x, y), there is a corresponding edge in G with the weight C between the two nodes x and y.

Link Identification

For the problem of MLC group model generation 220, the present invention defines the function P in Link Identification as a graph segmentation based on a minimum correlation threshold T. The specific value of T may be obtained based on a user's expertise (in this example a law enforcement investigator), which allows the user to validate different models based upon different thresholds and their expertise. Note that there may be multiple subgraphs M generated based on different values of T, indicating that there may possibly be multiple MLC groups identified in the given document collection. It is also possible that the original graph G(V, E) may not necessarily be connected (the complete graph G may have edges with correlation values 0, resulting in virtually an incomplete graph). Lastly, the generated models are output 230.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:
1. Method for solving a community generation problem, comprising the steps of:
   converting documents to digital form and tagging said digitized documents;
   parsing said digitized and tagged documents to extract the transaction history vector for each individual, wherein said step of parsing further comprises the step of applying the "one way nearest neighbor" principle;
   creating timelines of said transaction vectors so as to form a timeline map;
   determining the relevancy of said vectors;
   projecting said vectors along a time dimension so as to form a histogram;
   translating said vectors into groups of activities by histogram clustering;
   determining the local correlation between any pair of clusters in the timeline of two individuals;
   computing the global correlations between pairs of individuals;
   converting data to a graph as a function of all individuals extracted from said documents and the correlation values between said individuals;
   generating models based on a search of all subgraphs with correlation values above a threshold; and
   outputting a group model.

2. Method of claim 1, wherein said "one way nearest neighbor" principle further comprises the following steps as applied to a money laundering problem:

for every person's name encountered, the first immediate time instance is the first time instance for a series of financial activities; the second immediate time instance is the second time instance for another series of financial activities, etc.;

for every time instance encountered, all the subsequent financial activities are considered as the series of financial activities between this time instance and the next time instance;

financial activities are identified in terms of money amount; money amount is neutral in terms of deposit or withdrawal;

each person's time sequence of financial activities is updated if new financial activities of this person are encountered in other places of the same document or in other documents; and the financial activities of each time instance of a person is updated if new financial activities of this time instance of the same person are encountered in other places of the same document or in other documents.

3. Method of claim 1, wherein said step of determining the relevancy of said vectors further comprises a step of focusing on "clusters" of vectors in said timeline map and ignoring scattered (i.e., non-clustered) vectors in said timeline map.

4. Method of claim 1, wherein said step of translating said vectors into groups of activities further comprises solving a standard histogram clustering problem; and simplifying said standard clustering problem by virtue of all individuals sharing the same said timeline.

5. Method of claim 1, wherein said step of computing correlations between pairs of individuals further comprises computing the global correlation of all local correlations between pairs of individuals.

6. Method of claim 5, further comprising the step of computing local correlations by computing the correlation between two clusters corresponding to a pair of individuals on said histograms.

7. Method of claim 5 wherein said step of computing the global correlation of all local correlations between pairs of individuals further comprises computing the dot product between two vectors as follows:

$$C(x, y) = Cy(x) \cdot Cx(y) = \sum_{i=1}^{K} C(x_i, y)C(y_i, x)$$

where the vectors $Cy(x)$ and $Cx(y)$ are defined as $Cy(x) = <C(x_i, y), i=1,\ldots,K>$ $Cx(y) = <C(y_i, x), i=1,\ldots,K>$ where $C(x_i, y) = \max_{j=1}^{K} \{g(x_i, y_j)S(i,j)\}$ $$S(i, j) = e^{-\frac{(c_i - c_j)^2}{2\sigma_i^2}}$$

and where $\{g(x_i, y_j)S(i,j), j=1,\ldots,K\}$.

8. Method of claim 1, wherein said step of converting data to a graph further comprises obtaining a complete graph $G(V, E)$, where V is the set of all the individuals extracted from the given collection of the documents, and E is the set of all the correlation values between individuals such that for any correlation $C(x, y)$, there is a corresponding edge in G with the weight C between the two nodes x and y.

9. Method of claim 1, wherein said step of generating models further comprises the step of identifying links as a graph segmentation based on a minimum correlation threshold value.

10. Method of claim 9, wherein said minimum threshold value is selected based upon a user's expertise.

* * * * *